(12) United States Patent
Uthe

(10) Patent No.: US 7,427,987 B2
(45) Date of Patent: Sep. 23, 2008

(54) DISPLAYING MULTI-OWNERSHIP IN A TREE-MAP VISUALIZATION

(75) Inventor: Robert Thomas Uthe, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 835 days.

(21) Appl. No.: 10/420,688

(22) Filed: Apr. 22, 2003

(65) Prior Publication Data

US 2004/0212616 A1 Oct. 28, 2004

(51) Int. Cl.
*G06T 11/20* (2006.01)
(52) U.S. Cl. ...................................... 345/440
(58) Field of Classification Search ................ 345/440, 345/442.2, 853, 854, 855, 809, 808; 715/853, 715/854, 855, 808, 809
See application file for complete search history.

(56) References Cited

U.S. PATENT DOCUMENTS

| | | | | |
|---|---|---|---|---|
| 6,057,843 | A * | 5/2000 | Van Overveld et al. | 345/854 |
| 6,259,458 | B1 * | 7/2001 | Theisen et al. | 345/440 |
| 6,304,260 | B1 * | 10/2001 | Wills | 345/853 |
| 6,377,259 | B1 | 4/2002 | Tenev et al. | 345/440 |
| 6,496,208 | B1 | 12/2002 | Bernhardt et al. | 345/853 |
| 6,496,842 | B1 * | 12/2002 | Lyness | 345/854 |
| 6,509,898 | B2 * | 1/2003 | Chi et al. | 345/440 |
| 6,774,911 | B2 * | 8/2004 | Hodgson et al. | 345/853 |
| 2002/0154171 | A1 * | 10/2002 | Lee et al. | 345/781 |
| 2004/0168115 | A1 * | 8/2004 | Bauernschmidt et al. | 715/500 |
| 2004/0212615 | A1 * | 10/2004 | Uthe | 345/440 |

FOREIGN PATENT DOCUMENTS

| | | |
|---|---|---|
| EP | 0 950 962 | 10/1999 |
| EP | 0 955 591 | 11/1999 |

OTHER PUBLICATIONS

Interface 2003 Program, Thursday Mar. 13, http://www.galaxy.gmu.edu/interface/I03/I2003WebPage/schedule.html, pp. 1-6.*

(Continued)

*Primary Examiner*—Jeffery A. Brier
(74) *Attorney, Agent, or Firm*—Gerald A. Woods, Esq.; Steven M. Greenberg, Esq.; Carey Rodriguez Greenberg & Paul LLP

(57) ABSTRACT

A multi-ownership tree-map visualization system can include a tree-map configured to visualize a set of interrelated nodes in which at least one individual node in the set is related to at least two parent nodes in the set. The system further can include an event handler programmed to process a proximity event associated with a specific portion of the tree-map by highlighting multiple portions of the tree-map in which the portions represent a single node in the set. In this regard, the proximity event can include a mouse-over event, a mouse-click event, or a keyboard selection event, to name a few. The system yet further can include logic for displaying a call-out box for each portion of the tree-map associated with the single node in the set.

6 Claims, 3 Drawing Sheets

OTHER PUBLICATIONS

Simon Urbanek; Many Faces of a Tree; Mar. 14, 2003; Interface 2003: Security and Infrastructure Protection, ☐☐35th Symposium on the Interface, Salt Lake City, Utah ,Mar. 12-15, 2003, pp. 1-9.*

Bill Kules, Ben Shneiderman and Catherine Plaisant; Data Exploration with Paired Hierarchical Visualizations: Initial Designs of PairTrees; May 18-21, 2003; Proceedings of the 2003 annual national conference on Digital government research, Boston, MA ; Source ACM International Conference Proceeding Series; vol. 130; pp. 1-6.*

Johnson, et al., Tree-Maps: A Space-Filling Approach to the Visualization of Hierarchical, *Proc. IEEE Visualization '91*, pp. 284-291, San Diego, IEEE Computer Society Press. , <http:/ftp.cs.umd.edu/pub/hcil/Reports-Abstracts-Bibliography/91-06.html>, pp. 1-13, (Mar. 2003).

B. Shneiderman, *Treemaps for space-constrained visualiation of hierarchies*, HCIL, pp. 1-7, (Mar. 26, 2003), <http://www.cs.umd.edu/hcil/treemap-history/index.shtm.html>.

* cited by examiner

DISPLAYING MULTI-OWNERSHIP IN A TREE-MAP VISUALIZATION

BACKGROUND OF THE INVENTION

1. Statement of the Technical Field

The present invention relates to the field of data visualization and more particularly, to tree-map visualization.

2. Description of the Related Art

As computer technology advances, computing systems have undertaken the management and processing of larger data systems. With data systems ranging from massive standalone databases to vast distributed networks, oftentimes the limiting factor in analyzing the state of a given system rests not with computing resources, but with the human operator. Specifically, though the computing system may aggregate vast quantities of data in near real-time, in the end, a human being must visualize the compilation of data to draw effective conclusions from the visualization. Yet, the ability of the end user to digest compiled information varies inversely with the amount of data presented to the end user. Where the amount of compiled data becomes excessive, it can be nearly impossible for a human being to adequately analyze the data.

In an effort to address the foregoing difficulties, tree-map visualization methods have been developed. Initially proposed by Brian Johnson and Ben Shneiderman in the seminal paper, Johnson et al., *Tree-Maps: A Space-Filling Approach to the Visualization of Hierarchical Information Structures*, Dept. of Computer Science & Human-interaction Laboratory (University of Maryland June 1991), tree-map visualization techniques map "hierarchical information to a rectangular 2-D display in a space-filling manner" in which the entirety of a designated display space is utilized. Additionally, "[i]nteractive control allows users to specify the presentation of both structural (depth bounds, etc.) and content (display properties such as color mappings) information."

Notably, tree-map visualization techniques can be compared in a contrasting manner to traditional static methods of displaying hierarchically structured information. According to conventional static methods, a substantial portion of hierarchical information can be hidden from user view to accommodate the view of the hierarchy itself. Alternatively, the entire hierarchy can be visually represented, albeit vast amounts of display space can be obscured, hence wasted simply to accommodate the structure without regard to the hierarchical data in the hierarchy itself.

In the tree-map visualization technique, however, sections of the hierarchy containing more important information can be allocated more display space while portions of the hierarchy which are deemed less important to the specific task at hand can be allocated less space. More particularly, in operation tree-maps partition the display space into a collection of rectangular bounding boxes representing the tree structure. The drawing of nodes within the bounding boxes can be entirely dependent on the content of the nodes, and can be interactively controlled. Since the display size is user controlled, the drawing size of each node varies inversely with the size of the tree, for instance the number of nodes. Thus, trees having many nodes can be displayed and manipulated in a fixed display space, yet still be visible even when dealing with 1 million objects.

To date, the tree-map visualization technique has been limited to displaying strictly hierarchical data. This is a significant limitation that impedes the usefulness of the tree-map in many circumstances. For example, where a tree-map is used to visualize a system of servers for many different business processes in a single company, a particular server can support several of the business process. Thus, the server cannot be viewed as belonging to a single parent business process. In a conventional tree map, the server simply would be visually replicated in the bounding box for each business process. In such a case, however, it will not be apparent to the user that the server in one bounding box is the same server that is represented in one or more other bounding boxes in the tree-map.

SUMMARY OF THE INVENTION

The present invention is a system, method and apparatus for presenting multi-ownership in a tree-map. The method can include detecting a proximity event about a representation for a node in the tree-map and determining through the representation a unique identifier for the node. All other representations in the tree-map can be located which corresponding to the unique identifier. Consequently, each of the representations can be highlighted in the tree-map. In this regard, the step of highlighting can include displaying a call-out box for each of the representations. Moreover, the detecting step can include receiving either a mouse-over event or a mouse-click event in either an event handler for the tree-map or in an event handler for the representation about which the proximity event is detected.

A multi-ownership tree-map visualization system can include a tree-map configured to visualize a set of interrelated nodes in which at least one individual node in the set is related to at least two parent nodes in the set. The system further can include an event handler programmed to process a proximity event associated with a specific portion of the tree-map by highlighting multiple portions of the tree-map in which the portions represent a single node in the set. In this regard, the proximity event can include a mouse-over event, a mouse-click event, or a keyboard selection event, to name a few. The system yet further can include logic for displaying a call-out box for each portion of the tree-map associated with the single node in the set. Each call-out box also can display properties specific to the node, such as a label, as well as properties that are specific to the node's parent such as priority.

BRIEF DESCRIPTION OF THE DRAWINGS

There are shown in the drawings embodiments which are presently preferred, it being understood, however, that the invention is not limited to the precise arrangements and instrumentalities shown, wherein.

DETAILED DESCRIPTION OF THE PREFERRED EMBODIMENTS

The present invention is a system, method and apparatus for displaying multi-ownership in a tree-map visualization. Multi-ownership, as used herein, refers to the circumstance where a node within a set of nodes is represented among multiple parent nodes, multiple child nodes, or both multiple parent and child nodes. In this regard, multi-ownership does not comport strictly with a hierarchical structure. In accordance with the inventive arrangements, each node in the set of nodes can include a unique identifier. Whenever a node in the tree-map receives interest, such as when a mouse pointer passes in proximity to the node of interest, all other nodes in the tree-map which include the same unique identifier as the node of interest can be highlighted as can the node of interest. In this way, multi-ownership of the node of interest can be visually recognized by one observing the tree-map of the present invention.

Figure 1:
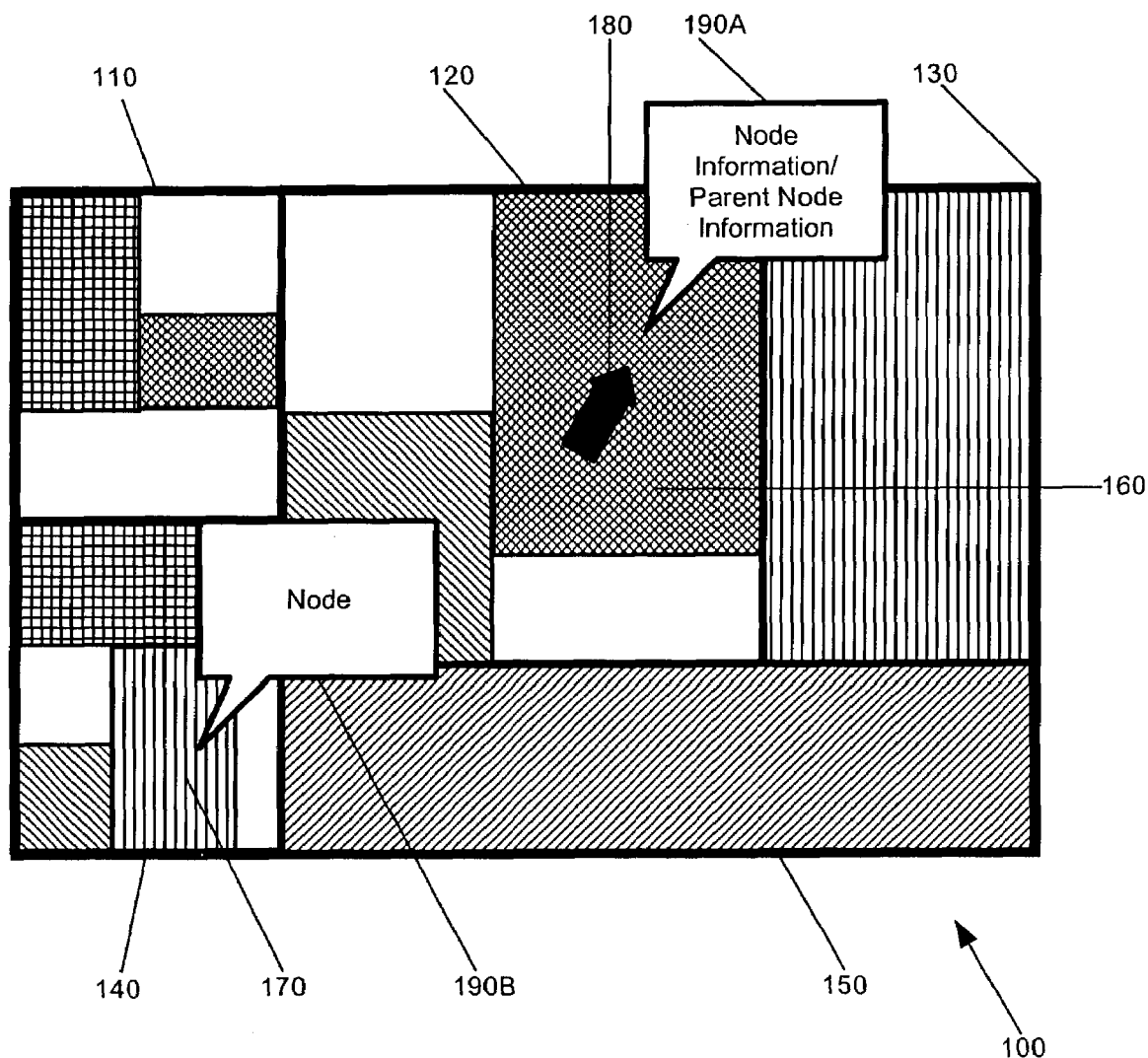
FIG. 1 is pictorial illustration of a multi-ownership tree-map visualization which has been configured in accordance with the inventive arrangements.

FIG. 1 is pictorial illustration of a multi-ownership tree-map visualization which has been configured in accordance with the inventive arrangements. The tree-map 100 can include a multiplicity of nested nodes 110, 120, 130, 140, 150, which can include a composition of one or more additionally nested nodes, such as the nodes 160, 170. As it is well-known in the art, a hierarchy of nodes can be displayed in tree-map form, although each node within the tree map is considered to be unique and independent. In this regard, it will not be apparent from the tree-map visualization where multiple representations of the same node occur within the tree map.

In the present invention, however, as shown in FIG. 1, where the nested node 160 is the same representation of a node as the node 170, one viewing the tree-map 100 can recognize the identity in multiple parent nodes 120, 140 through the highlighting of nodes 160, 170, and in the concurrent display of the identity in one or more call-out boxes 190A, 190B. More particularly, as a mouse pointer 180 passes within proximity to the node 160, not only can node 160 be highlighted and the call-out box 190A overlain about the node 160, but also node 170 can be highlighted and the call-out box 190B can be overlain about the node 170 within the parent node 140 conveying to the user that node 160 and node 170 are the same node. Furthermore, though not illustrated specifically in FIG. 1, the call-out boxes 190A, 190B could each convey a consistent label about the nodes 160, 170, or each one of the call-out boxes 190A, 190B could convey other information that may be influenced by the bounding boxes 120, 140. More particularly, call-out boxes can display properties specific to the node (as in the case of call-out box 190B), such as a label, as well as properties that are specific to the node's parent such as priority (as in the case of call-out box 190A).

Importantly, one skilled in the art will recognize that the invention is not merely limited to equating nodes 160, 170 on an identity basis. Rather, the skilled artisan will also recognize that other types of firmly established relationships can be visualized in accordance with the multi-ownership visualization technique of the present invention. To that end, where common characteristics of nodes are shared among multiple nodes, highlighting and call-out boxes can be overlain about the multiple nodes in the tree-map. Hence, the relationship between nodes based upon which the unique identifier can be assigned is limited only by the types of relationships which can be established between nodes and their underlying representative entity.

Figure 2:
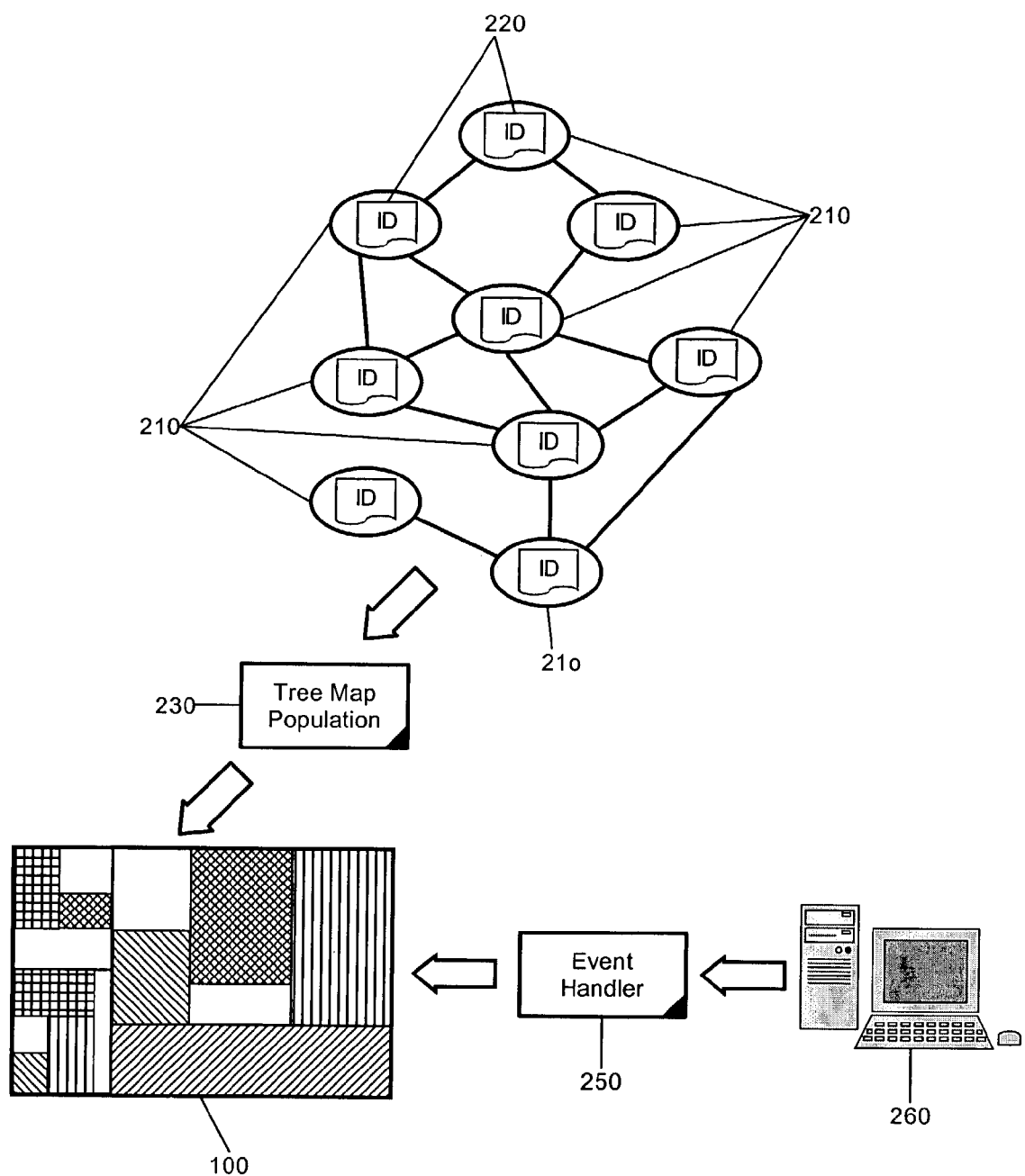
FIG. 2 is a schematic illustration of a tree-map visualization system which has been configured with the multi-ownership tree-map visualization of FIG. 1; and, FIG. 3 is a flow chart illustrating a process for handling multi-ownership in the tree-map visualization system of FIG. 2.

FIG. 2 is a schematic illustration of a tree-map visualization system which has been configured with the multi-ownership tree-map visualization of FIG. 1. The system can include a set of nodes 210 arranged in a hierarchy in which multiple nodes incorporate common nodes among one another. Each node can include a unique identifier 220. A tree-map population process 230 can process the set of nodes 210 into a tree-map 100. Importantly, though any one node 210 having a unique identifier can be represented by multiple locations within the tree-map 100, in consequence of the unique identifier 220, it can be determined in which multiple locations of the tree-map 100 the one node 210 can be located.

The system further can include an event handler 250 programmed to process operating system events received through a user interface 260 to the tree-map 100. Specifically, operating system events such as mouse movements, keyboard strikes and mouse clicks can be received in the user interface 260 and routed to the event handler 250. The event handler 250 can determine when the received operating system event should be interpreted as a request to identify an underlying node in the tree-map 100. To that end, the operating system event can range from a simple mouse click upon a portion of the tree-map corresponding to the node, to a mouse-over event in which the mouse pointer passes over the portion of the tree-map corresponding to node.

In any case, responsive to the receipt of such an event, the identity of the underlying node associated with the portion of the tree-map 100 can be presented through the user interface 260. For instance, a call-out box can be displayed in a similar manner to a tool-tip in which the identity of the node and ancillary data can be displayed. Significantly, in addition to displaying the call-out box, the tree-map 100 can be searched for other nodes 210 sharing the same unique identifier 220 as the node in the call-out box. For each found node, an additional call-out box or other presentation element can display or otherwise present the identity of the found node and any ancillary data which may be specific to the sub-hierarchy in which the other nodes 210 can be located. In this way, all portions of the tree-map 100 containing the same node 210 can be displayed concurrently through the user interface 260.

Figure 3:
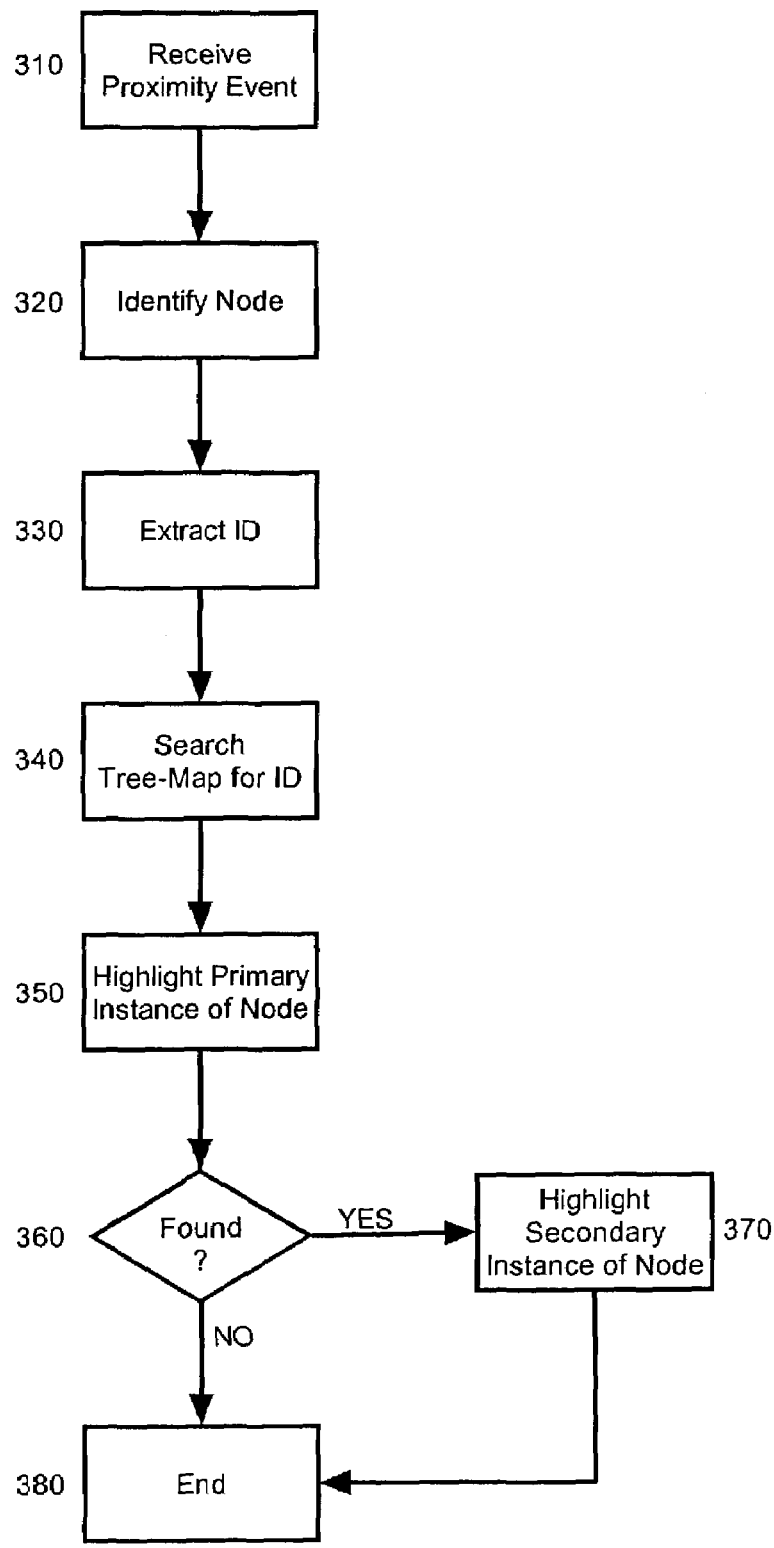

FIG. 3 is a flow chart illustrating a process for handling multi-ownership in the tree-map visualization system of FIG. 2. In step 310, a proximity event can be received in an event handler. The proximity event can include, but is not limited to mouse and keyboard induced movements which are proximate to a region of a tree-map representing an underlying node. In block 320, the underlying node can be identified. In block 330, the unique identifier for the underlying node can be extracted and in block 340, the tree-map can be searched for nodes sharing the same unique identifier.

In respect to the underlying node, the instance of the node can be highlighted in the tree-map. Specifically, a call-out box containing data for the underlying node such as a description or node name can be displayed, audibly spoken or presented using any other common user interface presentation manner. If in decision block 360 no other nodes in the tree-map share the same unique identifier, in block 380 the process can end. Importantly, however, if other nodes displayed in the tree-map share the same unique identifier, it can be presumed that the same node is represented in multiple portions of the tree map. Consequently, in block 370, the other instances of the node can be highlighted and have call-out boxes overlain concurrently with the highlighting of the primary instance of the node.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein.

The present invention can also be embedded in a computer program product, which comprises all the features enabling the implementation of the methods described herein, and which, when loaded in a computer system is able to carry out these methods. Alternatively, the present invention can be included as part of an electronically distributable user-interface such as those commonly encountered over the global Internet in the form of renderable markup language documents.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

I claim:

1. A method for presenting multi-ownership in a tree-map, the method comprising the steps of:

detecting a proximity event about a representation for a node in the tree-map;

determining through said representation a unique identifier for said node;

locating all other representations in the tree-map which corresponding to said unique identifier; and, highlighting each of said representations in the tree-map.

2. The method of claim 1, wherein said step of highlighting comprises displaying a call-out box for each of said representations.

3. The method of claim 1, wherein said detecting step comprises the step of receiving a mouse-over event in an event handler for the tree-map.

4. The method of claim 1, wherein said detecting step comprises the step of receiving a mouse-over event in an event handler for said representation about which said proximity event is detected.

5. The method of claim 1, wherein said detecting step comprises the step of receiving a mouse-click event in an event handler for the tree-map.

6. The method of claim 1, wherein said detecting step comprises the step of receiving a mouse-click event in an event handler for said representation about which said proximity event is detected.

* * * * *